US012684274B2

(12) United States Patent
Yuan et al.

(10) Patent No.: US 12,684,274 B2
(45) Date of Patent: Jul. 14, 2026

(54) SMART WEARABLE DEVICE

(71) Applicant: AAC ACOUSTIC TECHNOLOGIES (SHENZHEN) CO., LTD., Shenzhen (CN)

(72) Inventors: Junhao Yuan, Shenzhen (CN); Zhongping Lai, Shenzhen (CN); Hongyan Tao, Shenzhen (CN)

(73) Assignee: AAC ACOUSTIC TECHNOLOGIES (SHENZHEN) CO., LTD., Shenzhen (CN)

( * ) Notice: Subject to any disclaimer, the term of this patent is extended or adjusted under 35 U.S.C. 154(b) by 144 days.

(21) Appl. No.: 18/628,839

(22) Filed: Apr. 8, 2024

(65) Prior Publication Data

US 2025/0175724 A1      May 29, 2025

Related U.S. Application Data

(63) Continuation of application No. PCT/CN2023/133828, filed on Nov. 24, 2023.

(51) Int. Cl.
| | |
|---|---|
| *H04R 1/02* | (2006.01) |
| *G02B 27/01* | (2006.01) |
| *G02C 5/14* | (2006.01) |
| *G02C 11/06* | (2006.01) |

(52) U.S. Cl.
CPC ......... *H04R 1/025* (2013.01); *G02B 27/0176* (2013.01); *G02C 5/14* (2013.01); *G02C 11/06* (2013.01); *G02B 2027/0178* (2013.01)

(58) Field of Classification Search
CPC ................ H04R 1/025; G02B 27/0176; G02B 2027/0178; G02C 5/14; G02C 11/06
See application file for complete search history.

(56) References Cited

U.S. PATENT DOCUMENTS

| | | | |
|---|---|---|---|
| 2019/0238971 A1* | 8/2019 | Wakeland | .............. H04R 1/347 |
| 2024/0265905 A1* | 8/2024 | Li | .......................... H04R 1/347 |

FOREIGN PATENT DOCUMENTS

| | | | | |
|---|---|---|---|---|
| WO | WO-2023030111 A1 * | 3/2023 | ............. | H04R 1/025 |

* cited by examiner

*Primary Examiner* — Andrew Sniezek
(74) *Attorney, Agent, or Firm* — Wiersch Law Group

(57) ABSTRACT

The present invention provides a smart wearable device includes a glass frame and two temples. Each temple includes a shelf, a cover plate, and a speaker. The speaker includes a first and a second sounding surface. The shelf includes an upper wall, a lower wall, and an outer wall. The upper wall has a first sound hole, the lower wall has a second sound hole, the outer wall has a third sound hole. The speaker has an inner cavity communicated with the first sound hole. The first sounding surface is communicated with the second sound hole. The second sounding surface is communicated with the third sound hole. Two front cavities of the smart wearable device of present invention are independent of each other, and each has an independent sound hole, so that the two cavities can independently produce sound, the back cavity plays a role in preventing sound leakage.

10 Claims, 3 Drawing Sheets

100

SMART WEARABLE DEVICE

FIELD OF THE PRESENT INVENTION

The present invention relates to the field of smart wearable device, and more particularly, to a sounding structure of the smart wearable device.

DESCRIPTION OF RELATED ART

With the rapid development of the electronics industry, smart devices with playback functions are also rapidly emerging. That is, on the basis of conventional smart devices, structures such as sound-generating devices and microphones are added, so that the smart devices can play the functions of music playback and phone calls. Such as smart glasses, VR equipment, mobile phones, tablets, etc.

For smart devices with playback functions, in addition to sound quality, privacy requirements are also particularly important. That is, in addition to the user being able to hear the playback content clearly, it is also necessary to prevent others from hearing the playback content.

In the related art, smart wearable devices are generally equipped with a single-sided speaker, which contains a corresponding front cavity and a back cavity. However, the sound effect of such smart wearable devices is not ideal and the sound quality is poor.

Therefore, it is desired to provide a new smart wearable device which can overcome the above problems.

SUMMARY

In view of the above, the embodiments of the present invention provide a new smart wearable device, and the sound quality of smart wearable devices is better and the privacy is strong.

The present invention provides a smart wearable device includes a glass frame and a pair of temples extending backward from both sides of the glass frame. Each temple includes a shelf, a cover plate covered with the shelf to form a receiving space, and a speaker received in the receiving space. The speaker includes a first sounding surface and a second sounding surface opposite to the first sounding surface. The shelf includes an upper wall, a lower wall opposite to the upper wall, and an outer wall connecting the upper wall and lower wall. The cover plate is arranged opposite to the outer wall. The upper wall is provided with a first sound hole, the lower wall is provided with a second sound hole, and the outer wall is provided with a third sound hole. The speaker has an inner cavity communicated with the first sound hole. The first sounding surface is communicated with the second sound hole, and the second sounding surface is communicated with the third sound hole.

As an improvement, the smart wearable device further includes a first bracket supporting the speaker in the receiving space, one end of the first bracket fixed with the upper wall of the shelf, and the other end of the first bracket fixed with the lower wall of the shelf, a first front cavity formed between the first bracket and the first sounding surface of the speaker, the first front cavity guiding a sound emitted by the first sounding surface out of the second sound hole.

As an improvement, the smart wearable device further includes a second bracket supporting the speaker in the receiving space, a second front cavity formed by the second bracket, the second sounding surface of the speaker, and the outer wall of the shelf, the second front cavity guiding a sound emitted by the second sounding surface out of the third sound hole.

As an improvement, the first bracket, the second bracket and the shelf form a back cavity communicated with the inner cavity of the speaker, the back cavity arranged around the speaker, and the back cavity guiding a sound from the inner cavity out of the first sound hole.

As an improvement, the first bracket includes a main body and an extension body extending from the main body, the extension body having a shape corresponding to the second sound hole, a first foam disposed between the extension body and the shelf surrounding the second sound hole.

As an improvement, the first foam is fixed to the shelf or/and the first bracket by gluing.

As an improvement, the second bracket is an annular structure, a second foam disposed between the second bracket and the shelf surrounding the third sound hole.

As an improvement, the second foam is fixed to the shelf or/and the second bracket by gluing.

As an improvement, a third foam is disposed between the first bracket and the shelf surrounding the first sound hole, and between the second bracket and the shelf surrounding the first sound hole.

As an improvement, the third foam is fixed to the shelf, or/and the first bracket, or/and the second bracket by gluing.

As an improvement, the smart wearable device further includes a plurality of meshes correspondingly attached to the first sound hole, the second sound hole, and the third sound hole.

BRIEF DESCRIPTION OF THE DRAWINGS

Many aspects of the exemplary embodiments can be better understood with reference to the following drawing. The components in the drawing are not necessarily drawn to scale, the emphasis instead being placed upon clearly illustrating the principles of the present invention. Moreover, in the drawings, like reference numerals designate corresponding parts throughout the several views.

DETAILED DESCRIPTION OF THE EXEMPLARY EMBODIMENTS

The present invention will hereinafter be described in detail with reference to exemplary embodiments. To make the technical problems to be solved, technical solutions and beneficial effects of the present invention more apparent, the present invention is described in further detail together with the figures and the embodiments. It should be understood the specific embodiments described hereby is only to explain the disclosure, not intended to limit the disclosure.

Figure 1:
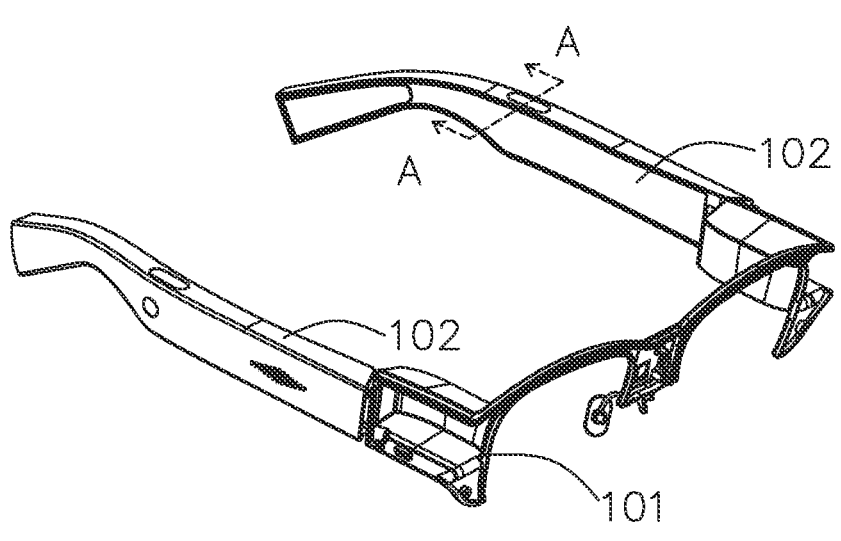
FIG. 1 is an illustrative isometric view of a smart wearable device in accordance with one embodiment of the present invention.
Figure 2:
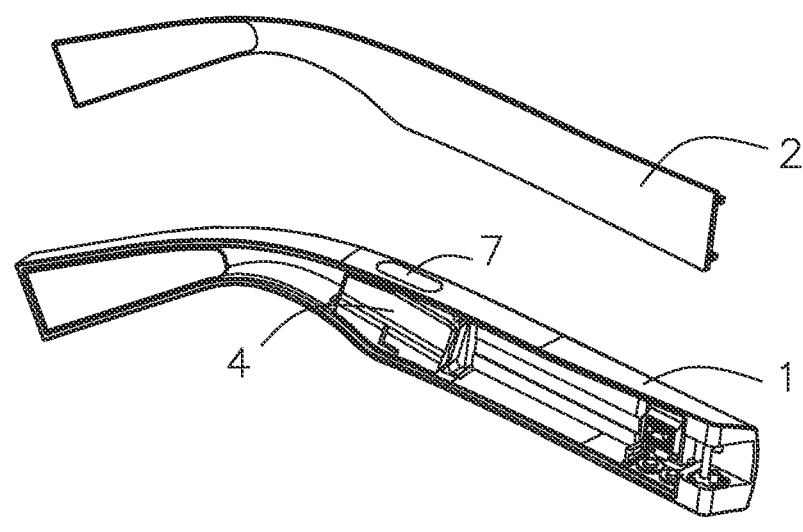
FIG. 2 is a partially exploded view of partly members of the smart wearable device of FIG. 1.
Figure 3:
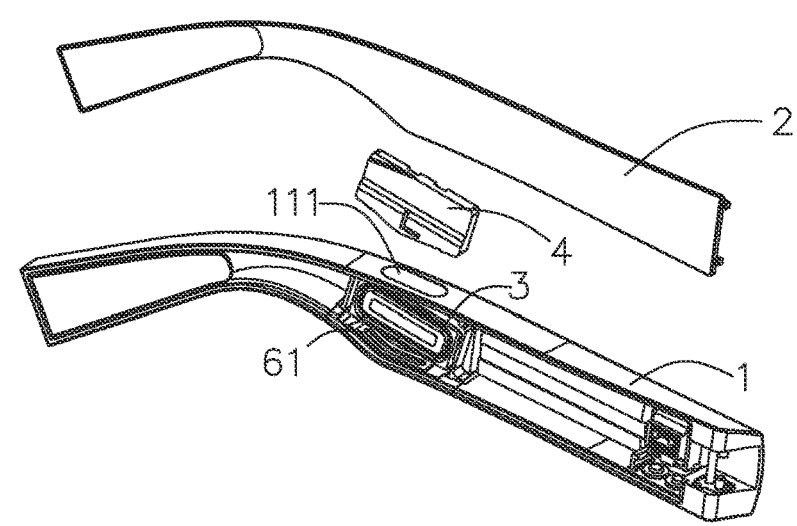
FIG. 3 is another partially exploded view of partly members of the smart wearable device of FIG. 2.
Figure 4:
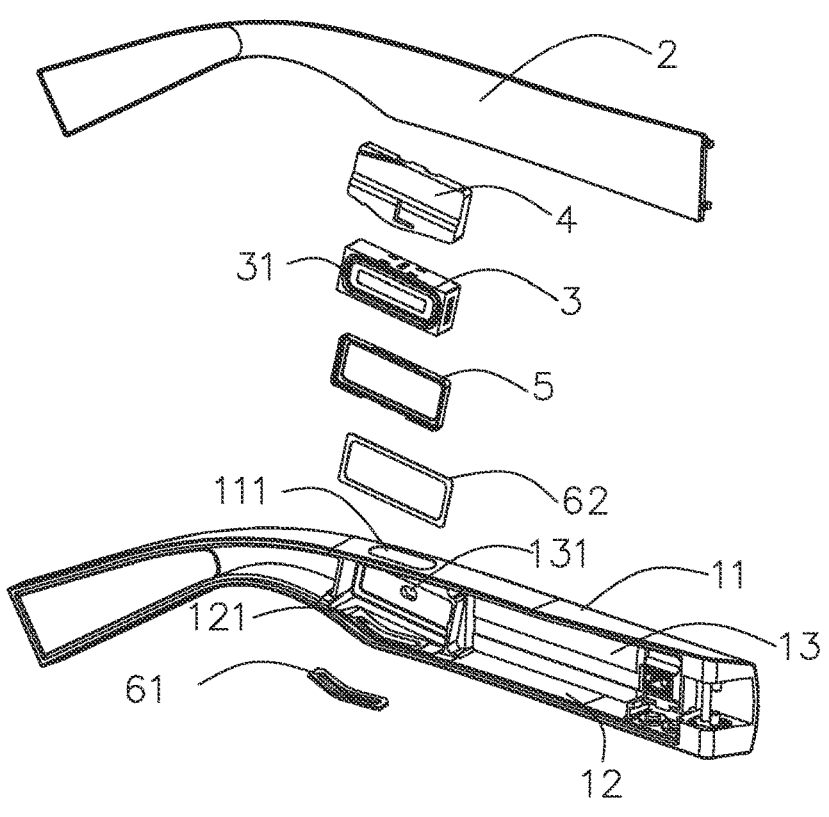
FIG. 4 is an exploded view of partly members of the smart wearable device of FIG. 2.
Figure 5:
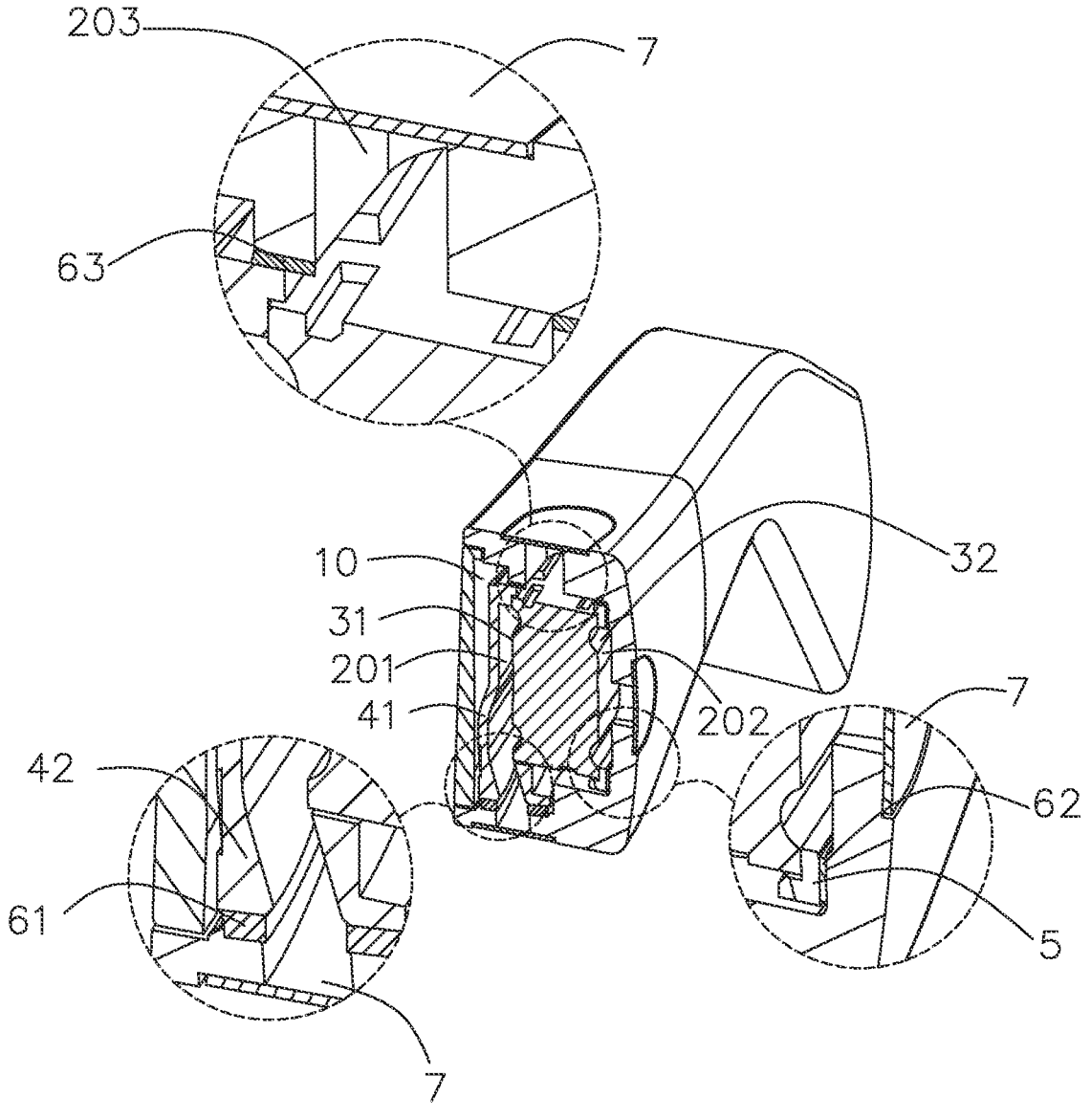
FIG. 5 is an illustrative cross-sectional view of the smart wearable device taken along line A-A of FIG. 1.

Referring to the FIGS. 1-5, the present invention provides one embodiment of a smart wearable device 100. The smart wearable device 100 includes a glass frame 101 and a pair of temples 102 extending backward from both sides of the glass frame 101. Lenses can be installed on the glass frame 101. Two temples 102 have the same structure, and two temples 102 have a centrally symmetrical structure.

Each temple 102 includes a shelf 1, a cover plate 2 covered with the shelf 1 to form a receiving space 10, a speaker 3 received in the receiving space 10, a first bracket 4 and a second bracket 5 supporting the speaker 3 in the receiving space 10, a first foam 61, a second foam 62, and a third foam 63.

The shelf 1 includes an upper wall 11, a lower wall 12 opposite to the upper wall 11, and an outer wall 13 connecting the upper wall 11 and lower wall 12. The cover plate 2 is arranged opposite to the outer wall 13. The cover plate 2 is located at a side of the shelf 1 close to the human ear, and the outer wall 13 is located away from the human ear. The upper wall 11 is provided with a first sound hole 111, the lower wall 12 is provided with a second sound hole 121, and the outer wall 13 is provided with a third sound hole 131.

The speaker 3 includes a first sounding surface 31 and a second sounding surface 32 opposite to the first sounding surface 31. The speaker 3 has an inner cavity communicated with the first sound hole 111. The inner cavity is a cavity formed by a space between the first sounding surface 31 and the second sounding surface 32 of the speaker 3. The second sound hole 121 is communicated with the first sounding surface 31 of the speaker 3, and the third sound hole 131 is communicated with the second sounding surface 32 of the speaker 3.

One end of the first bracket 4 is fixed with the upper wall 11 of the shelf 1, and the other end of the first bracket 4 is fixed with the lower wall 12 of the shelf 1. A first front cavity 201 is formed between the first bracket 4 and the first sounding surface 31 of the speaker 3. The first front cavity 201 guides a sound emitted by the first sounding surface 31 out of the second sound hole 121. The first bracket 4 includes a main body 41 and an extension body 42 extending from the main body 41. The extension body 42 has a shape corresponding to the second sound hole 121. The first foam 61 is disposed between the extension body 42 and the shelf 1 surrounding the second sound hole 121. The first foam 61 is fixed to the shelf 1 or/and the first bracket 4 by gluing.

A second front cavity 202 is formed by the second bracket 5, the second sounding surface 32 of the speaker 3, and the outer wall 13 of the shelf 1. The second front cavity 202 guides a sound emitted by the second sounding surface 32 out of the third sound hole 131. The second bracket 5 is an annular structure. The second foam 62 is disposed between the second bracket 5 and the shelf 1 surrounding the third sound hole 131. The second foam 62 is fixed to the shelf 1 or/and the second bracket 5 by gluing.

The first foam 61 and the second foam 62 are both annular structures. The first front cavity 201 and the second front cavity 202 are isolated from each other. Due to the function of the first foam 61 and the second foam 62, the sealing between the first front cavity 201 and the second front cavity 202 is better.

The first bracket 4, the second bracket 5 and the shelf 1 form a back cavity 203 communicated with the inner cavity of the speaker 3. The back cavity 203 is annular structure and is arranged around the speaker 3. The back cavity 203 guides a sound from the inner cavity out of the first sound hole 111.

The third foam 63 is disposed between the first bracket 4 and the shelf 1 surrounding the first sound hole 111, and between the second bracket 5 and the shelf 1 surrounding the first sound hole 111. The third foam 63 is fixed to the shelf 1, or/and the first bracket 4, or/and the second bracket 5 by gluing.

The third foam 63 is also an annular structure. The back cavity 203 is isolated from the first front cavity 201 and the second front cavity 202. Due to the function of the third foam 63, the sealing between the first front cavity 201, the second front cavity 202, and the back cavity 203 is better.

The smart wearable device 100 further includes a plurality of meshes 7 correspondingly attached to the first sound hole 111, the second sound hole 121, and the third sound hole 131. The meshes 7 can prevent dust or water vapor from entering the receiving space 10 in the temple 102.

Comparing with the related art, the present invention provides a smart wearable device including a glass frame and a pair of temples extending backward from both sides of the glass frame. Each temple includes a shelf, a cover plate covered with the shelf to form a receiving space, and a speaker received in the receiving space. The speaker includes a first sounding surface and a second sounding surface opposite to the first sounding surface. The shelf includes an upper wall, a lower wall opposite to the upper wall, and an outer wall connecting the upper wall and lower wall. The cover plate is arranged opposite to the outer wall. The upper wall is provided with a first sound hole, the lower wall is provided with a second sound hole, and the outer wall is provided with a third sound hole. The speaker has an inner cavity communicated with the first sound hole. The first sounding surface is communicated with the second sound hole, and the second sounding surface is communicated with the third sound hole.

The two front cavities of the smart wearable device of the present invention are independent of each other, and each has an independent sound hole, so that the dual front cavities can independently produce sound, and the back cavity plays a role in preventing sound leakage. The sound guided from the back cavity offsets the sound guided from the two front cavities, so that when the smart wearable device is in use, other people will not hear the sound emitted by the smart wearable device, and the privacy of the smart wearable device is high.

It is to be understood, however, that even though numerous characteristics and advantages of the present exemplary embodiments have been set forth in the foregoing description, together with details of the structures and functions of the embodiment, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A smart wearable device, comprising:
   a glass frame; and
   a pair of temples extending backward from both sides of the glass frame, each temple comprising:
      a shelf, the shelf comprising:
         an upper wall, the upper wall provided with a first sound hole;
         a lower wall opposite to the upper wall, the lower wall provided with a second sound hole; and
         an outer wall connecting the upper wall and lower wall, the outer wall provided with a third sound hole;
      a cover plate covered with the shelf to form a receiving space, the cover plate arranged opposite to the outer wall; and a speaker received in the receiving space, the speaker having an inner cavity communicated with the first sound hole, the speaker comprising a first sounding surface and a second sounding surface opposite to the first sounding surface, the first sounding surface communicated with the second sound hole, and the second sounding surface communicated with the third sound hole;

wherein the smart wearable device further comprises a first bracket supporting the speaker in the receiving space, one end of the first bracket fixed with the upper wall of the shelf, and the other end of the first bracket fixed with the lower wall of the shelf, a first front cavity formed between the first bracket and the first sounding surface of the speaker, the first front cavity guiding a sound emitted by the first sounding surface out of the second sound hole.

2. The smart wearable device as described in claim 1, wherein the smart wearable device further comprises a second bracket supporting the speaker in the receiving space, a second front cavity formed by the second bracket, the second sounding surface of the speaker, and the outer wall of the shelf, the second front cavity guiding a sound emitted by the second sounding surface out of the third sound hole.

3. The smart wearable device as described in claim 2, wherein the first bracket, the second bracket and the shelf form a back cavity communicated with the inner cavity of the speaker, the back cavity arranged around the speaker, and the back cavity guiding a sound from the inner cavity out of the first sound hole.

4. The smart wearable device as described in claim 2, wherein the second bracket is an annular structure, a second foam disposed between the second bracket and the shelf surrounding the third sound hole.

5. The smart wearable device as described in claim 4, wherein the second foam is fixed to the shelf or/and the second bracket by gluing.

6. The smart wearable device as described in claim 3, wherein a third foam is disposed between the first bracket and the shelf surrounding the first sound hole, and between the second bracket and the shelf surrounding the first sound hole.

7. The smart wearable device as described in claim 6, wherein the third foam is fixed to the shelf, or/and the first bracket, or/and the second bracket by gluing.

8. The smart wearable device as described in claim 1, wherein the first bracket comprises a main body and an extension body extending from the main body, the extension body having a shape corresponding to the second sound hole, a first foam disposed between the extension body and the shelf surrounding the second sound hole.

9. The smart wearable device as described in claim 8, wherein the first foam is fixed to the shelf or/and the first bracket by gluing.

10. The smart wearable device as described in claim 1, wherein the smart wearable device further comprises a plurality of meshes correspondingly attached to the first sound hole, the second sound hole, and the third sound hole.

* * * * *